United States Patent [19]
Radna

[11] Patent Number: 4,934,420
[45] Date of Patent: Jun. 19, 1990

[54] GRAVY SEPARATING DEVICE

[76] Inventor: Rachel Radna, 2616 Arlington Ave., Bronx, N.Y. 10463

[21] Appl. No.: 313,164

[22] Filed: Feb. 21, 1989

[51] Int. Cl.$^5$ ............................................. A47J 43/28
[52] U.S. Cl. .................................. 141/340; 141/98; 141/331; 141/363; 141/364; 141/375; 99/495; 210/514; 210/533; 220/301
[58] Field of Search ............... 210/514, 515, 535, 534, 210/537, 532.1; 141/98, 375, 331, 340, 341, 342, 363, 364, 365, 366; 220/300, 301; 99/495

[56] References Cited

U.S. PATENT DOCUMENTS

| | | | |
|---|---|---|---|
| 241,033 | 5/1881 | Lewis | 137/579 |
| 251,773 | 1/1882 | Eggers | 141/364 X |
| 315,448 | 4/1885 | Stoddard | 210/175 |
| 697,613 | 4/1902 | Ellis | 62/389 |
| 802,997 | 10/1905 | Laenger | 210/535 |
| 1,516,881 | 11/1924 | Collins | 210/514 X |
| 1,828,040 | 10/1931 | Hahm | 210/533 X |
| 2,093,575 | 9/1937 | Roberts | 210/535 |
| 2,419,666 | 4/1947 | Werth | 210/532.1 |
| 2,583,335 | 1/1952 | Jepson | 210/534 |
| 2,679,878 | 6/1954 | Stine | 220/300 |
| 2,765,105 | 10/1956 | Sullivan | 210/533 X |
| 2,799,437 | 7/1957 | Jepson | 222/481 |
| 3,257,170 | 6/1966 | Marcus et al. | 422/101 |
| 3,656,912 | 4/1972 | Sugawara | 210/514 |
| 3,713,778 | 1/1973 | Karamian | 422/101 |
| 3,836,334 | 9/1974 | Karamian | 422/101 |
| 3,865,023 | 2/1975 | Halvorsen | 99/495 |
| 4,031,032 | 6/1977 | Jablecki | 210/474 |
| 4,099,654 | 7/1978 | Antolino | 141/344 X |
| 4,331,189 | 5/1982 | Joyner | 141/343 |
| 4,389,926 | 6/1983 | Joyner | 99/495 |
| 4,464,265 | 8/1984 | Joyner | 99/495 X |
| 4,595,030 | 1/1986 | Yazaki | 210/534 X |
| 4,640,185 | 2/1987 | Joyner | 99/495 |

OTHER PUBLICATIONS

Advertisement *Better Homes & Gardens New Cook Book Gravy/Soup Separator.*

*Primary Examiner*—Ernest G. Cusick
*Attorney, Agent, or Firm*—Frishauf, Holtz, Goodman & Woodard

[57] ABSTRACT

A device for separating fat from gravy includes a funnel-like separating member having a lowermost section, a conduit extending down from the lowermost section for supplying liquid from the lowermost section, and an opening in an upper end thereof, the separating member and the conduit being transparent to permit viewing of the liquids therein; a stop cock positioned in the conduit for selectively permitting passage of liquid through the conduit; a container having an open upper end, a pouring spout at the open upper end and a handle opposite the pouring spout; a screen filter at the open upper end of the container which permits only liquids through the open upper end of the separating member; a cover held on the container in covering relation to the open upper end of the container, the cover having an opening therein which receives the conduit so as to support the separating member thereon; and locking flanges which removably lock the cover on the container.

16 Claims, 1 Drawing Sheet

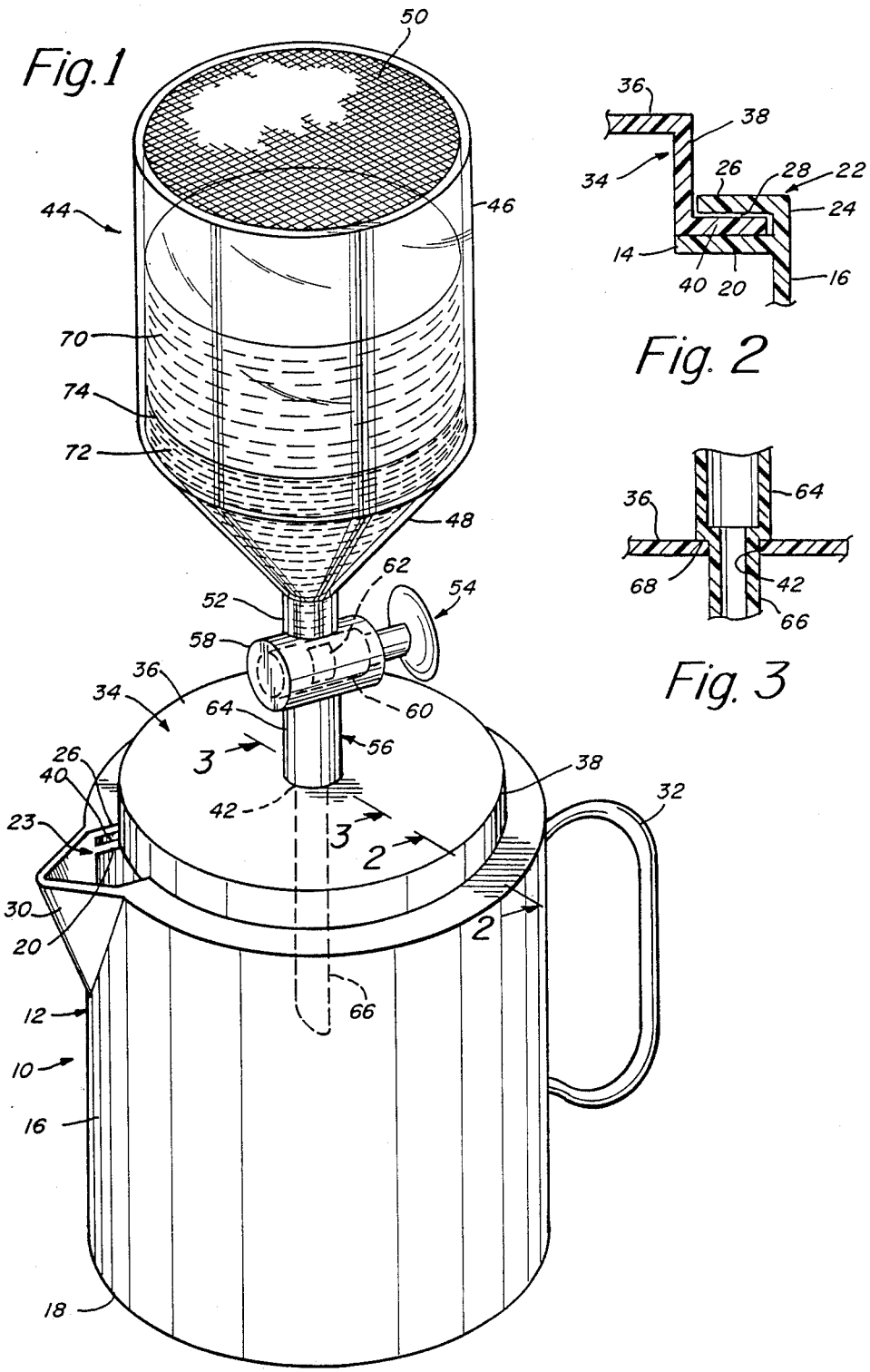

GRAVY SEPARATING DEVICE

BACKGROUND OF THE INVENTION

This invention relates generally to devices for separating immiscible liquids having different specific gravities, and more particularly, is directed to a gravy separating device.

As is known, after a turkey (or other similarly cooked foodstuff) is cooked, it is desirable to make gravy from the liquid formed thereby. However, such liquid contains a large amount of fat. It is therefore desirable to separate the fat portion from the gravy. The present invention makes use of the fact that fat has a different specific gravity from the remainder of the liquid, and therefore rises to top of the liquid when the liquid is placed in a container.

Devices for separating immiscible liquids are well-known in the art. For example, U.S. Pat. No. 3,713,778 to Karamian and U.S. Pat. No. 3,836,334 to Karamian both disclose separatory funnels. Specifically, U.S. Pat. No. 3,713,778 discloses an arrangement in which a flask container is provided with a stopper closure at the upper end thereof through which a liquid can be poured. The open lower section thereof fits on a plug, and a threaded conduit extends upwardly through the plug. A tube is threadedly connected with the conduit and extends to an upper level in the flask container. The lower end of the threaded conduit is connected with a stopcock valve. In operation, when various chemicals are inserted into the flask container and agitated, the chemicals will separate into an upper layer and a lower layer. Then, the height of the tube in the container is adjusted by the threaded conduit so that the upper end thereof is at the separation or division line between the liquid chemicals. The stopcock is then opened to drain the upper layer of liquid. In addition, the various embodiments provide means by which the lower layer can be drained after the upper layer has been drained. U.S. Pat. No. 3,836,334 discloses a similar arrangement.

However, there is no associated container or the like which can be connected with the devices disclosed in the above-mentioned patents for collecting the lower liquid layer, or any means for releasably connecting the disclosed device to such an associated container. Further, to use these devices for separating gravy would be cumbersome.

U.S. Pat. No. 315,448 to Stoddard discloses a milk settling apparatus which is nearly identical in its relevant aspects to U.S. Pat. No. 3,713,778 to Karamian. Further, a glass pane is provided through which the separation level can be viewed at the top of the inner tube.

U.S. Pat. No. 3,257,170 to Marcus et al discloses a liquid separatory apparatus in which an upper container has a lower opening which forms a fluid-tight seal with the upper end of a separating funnel and which can be assembled and disassembled therewith. A stop cock is provided in the funnel, and a separate tube is provided between the stop cock and the interior of the container for supplying air to the interior of the container as the liquid is drained therefrom. See also U.S. Pat. No. 3,656,912 to Sugawara for a similar arrangement.

U.S. Pat. No. 697,613 to Ellis discloses a cream separator in which a cone-shaped partition is provided at the lower section of a container. The upper section of the container and the cone-shaped partition are both provided with site-glasses through which the ingredients can be viewed. A holder is provided at the lower portion of the cone-shaped partition for holding ice thereat, and a conduit extends from the upper section of the container to the apex or lower portion of the cone-shaped partition for supplying water thereto. A discharge pipe is connected to the apex of the cone-shaped partition and includes an exterior cock or faucet. When the water is supplied to the cone-shaped partition, it is chilled by the ice, and then mixes with the milk to separate the cream therefrom. Then, the lower level of liquid can be removed through the discharge pipe.

U.S. Pat. No. 2,093,575 to Roberts discloses a visible measuring device for gasoline dispensing pumps in which sediment falls to a lower level into a conical collecting basin, while the gasoline sits thereabove in the conical collecting basin and the measuring receptacle situated thereabove. An integral nipple is formed at the lower apex of the conical collecting basin for removing the sediment, and a nipple is formed at a higher level in the measuring receptacle for removing gasoline to be dispensed to the customer. The measuring receptacle and conical collecting basin are transparent.

U.S. Pat. No. 802,997 to Laenger discloses a cistern which operates in a similar manner to the aforementioned U.S. Pat. No. 2,093,575 to Roberts, and additionally includes a filter or strainer at the upper end thereof through which the liquid is passed before entering the container. U.S. Pat. Nos. 241,033 to Lewis; 2,419,666 to Werth; and 2,799,437 to Jepson, disclose different constructions of separating devices.

While all of the above devices are useful in some way for providing separation of two immiscible liquids, it would be difficult and inefficient to use the same for separating gravy from fat in ordinary kitchen circumstances when, for example, cooking a turkey.

OBJECTS OF THE INVENTION

It is an object of the present invention to provide a gravy separating device that overcomes the aforementioned problems with the prior art.

It is another object of the present invention to provide a gravy separating device that easily separates fat from gravy when cooking, for example, a turkey.

It is still another object of the present invention to provide a gravy separating device that easily separates fat from gravy in a quick, efficient and accurate manner.

It is yet another object of the present invention to provide a gravy separating device in which the division line between the fat and gravy can be viewed for accurately controlling the separating operation.

It is a further object of the present invention to provide a gravy separating device in which the gravy and fat are separated into two different container sections, both of which form part of the device, and the two different container sections can be disassembled to separately dispose of the liquids therein.

It is a still further object of the present invention to provide a gravy separating device in which the upper separating member is supported on the lower container.

The above and other objects, features and advantages of the present invention will become readily apparent from the following detailed description which is to be read in connection with the accompanying drawings.

SUMMARY OF THE INVENTION

In accordance with an aspect of the present invention, a device for separating liquids having different specific gravities, includes a funnel-like separating member having a lowermost funnel section, conduit means extending down from the lowermost section for supplying liquid from the lowermost section, and an opening in an upper end thereof, the separating member and the conduit means being at least partially transparent to permit viewing of liquids therein; stop cock means positioned in the conduit means for selectively permitting passage of liquid through the conduit means; a container having an open upper end; cover means removably held on the container in covering relation to the open upper end of the container, the cover means having an opening therein for receiving the conduit means so as to support the separating member thereon; and locking means for removably locking the cover means on the container.

BRIEF DESCRIPTION OF THE DRAWINGS

FIG. 1 is a perspective view of a gravy separating device according to the present invention;

FIG. 2 is cross-sectional view of a portion of the gravy separating device of FIG. 1, taken along line 2—2 thereof; and FIG. 3 is a cross-sectional view of a portion of the gravy separating device of FIG. 1, taken along line 3—3 thereof.

DETAILED DESCRIPTION

Referring to the drawings in detail, a gravy separating device 10 according to the present invention includes a container 12 having an open upper end 14 (see FIG. 2). The container 12 is formed with a cylindrical side wall 16 and a bottom wall 18. An inwardly turned lip 20 is formed at the upper end of container side wall 16 and defines open upper end 14 (see FIG. 2) of container 12.

Further, as shown in FIG. 2, container 12 includes an annular inwardly directed L-shaped flange 22 integrally formed on the upper end of side wall 16. Flange 22 includes a cylindrical wall portion 24 extending upwardly as a continuation of side wall 16 and an inwardly directed annular wall 26 extending inwardly from the upper end of wall 24 but to a lesser extent than lip 20. Accordingly, an annular gap 28 is formed between lip 20 and wall 26. Further, container 12 can be made transparent.

A pouring spout 30 is formed at the upper end of cylindrical side wall 16, and lip 20 and L-shaped flange 22 are cut-away thereat, indicated generally by numeral 23, as best shown in FIG. 1. A handle 32 is formed on the outer surface of side wall 16, diametrically opposite pouring spout 30.

Gravy separating device 10 further includes a cover 34 having an upper annular plate 36 and a lip 38 extending downwardly from the outer peripheral edge of plate 36. The outer dimensions of lip 38 are substantially the same as the open upper end 14 of container 12, that is, the inner dimensions of lip 38 are substantially the same as the inner dimensions of lip 20, as best shown in FIG. 2. A locking flange 40 having a small circumferential dimension, extends radially outward from a portion of lip 38, and is adapted to be received in annular gap 28 so as to releasably lock cover 34 onto container 12. Locking flange 40 has a circumferential dimension smaller than that of cut-away portion 23. Thus, in order to assemble cover 34 with container 12, locking flange 40 is inserted through cut-away portion 23, and then into gap 28 between lip 20 and wall 26 to releasably lock cover 34 to container 12.

In addition, upper annular plate 36 of cover 34 includes a central aperture 42, the purpose of which will become apparent from the description which follows.

Gravy separating device 10 further includes a separating member 44 in the form of an upper cylindrical member 46 and an integral lower frusto-conical member 48 in fluid communication with each other. Separating member 44 is preferably transparent. The upper end of cylindrical member 46 is open and a filter 50 is preferably secured thereover. Filter 50 can comprise a wire mesh screen or the like. The lower end of frusto-conical member 48 is also open and is integrally connected with a transparent conduit 52 so as to be in fluid communication therewith. A stop cock 54 is connected to the lower end of conduit 52, and a conduit 56 is connected at its upper end to the bottom of stop cock 54. Thus, depending upon the operation of stop cock 54, liquid can travel between conduits 52 and 56, or be blocked by stop cock 54.

Stop cock 54 includes a housing 58 to which conduits 52 and 56 are connected. A plug 60 is rotatably positioned in housing 58 so as to selectively block the flow of liquid between conduits 52 and 56. Plug 60 is hollow and has diametrical slots 62 therein each of which extends, for example, along a 90 degree arc and each of which has a lengthwise dimension of, for example, 4 mm. Thus, when plug 60 is rotated to the position of dashed lines in FIG. 1, no liquid can travel between conduits 52 and 56. However, when plug 60 is rotated slightly so that diametrical slots 62 are in line with conduits 52 and 56, liquid can travel therebetween. It will be appreciated that the quantity of liquid that is permitted to travel through stop cock 54, and thereby the flow rate from conduit 52 to conduit 56, will depend upon those portions of slots 62 in fluid communication with conduits 52 and 54. For example, if plug 60 is rotated 90 degrees from the position shown in FIG. 1, both slots 62 will be fully open to conduits 52 and 56, while if plug 60 is rotated only 45 degrees from the position shown in FIG. 1, only one-half of each slot 62 will be in communication with the respective conduits 52 and 56, resulting in a reduced flow rate. The stop cock 54 may take other forms as known in the art.

As shown in FIGS. 1 and 3, conduit 56 is formed from an upper tube 64 of a first diameter and which is connected to stop cock 54, and a lower integral tube 66 of a second, smaller diameter. Accordingly, an annular shoulder 68 is formed between tubes 64 and 66. The outer diameter of tube 66 is slightly smaller than that of aperture 42 of cover 34, while the outer diameter of tube 64 is larger than that of aperture 42. Accordingly, shoulder 68 sits upon the upper surface of plate 36 of cover 34 to support separating member 44 thereon.

In operation, after, for example, a turkey is cooked, and the liquid therefrom is deposited through filter 50 into separating member 44. Filter 50 prevents large solid particles from entering separating member 44. At this time, stop cock 54 is closed to prevent any liquid from passing therethrough. After a period of time, the fat 70 in the liquid will separate from the remainder of the liquid, such remainder constituting the gravy 72, as shown in FIG. 1. Specifically, the fat 70 will rise to the top of the liquid. This separation can be viewed through separating member 44 which is transparent. Then, stop cock 54 is opened, preferably to its full extent, whereupon the lower gravy 72 falls through conduits 52 and 56 and into container 12. When the interface 74 between the fat 70 and gravy 72 comes close to stop cock 54, plug 60 of stop cock 54 is turned toward its "closed" position to reduce the fluid flow therethrough. When interface 74 is at stop cock 54, plug 60 of stop cock 54 is closed entirely. Thereupon, separating member 44 is removed from cover 34, so that the fatty liquid 70 can be disposed of. Gravy 72 remaining in container 12, on the other hand, can be poured into a dish or the like through spout 30. Since the device easily disassembles, it is relatively easy to thoroughly clean same after use.

It will be appreciated from the foregoing that the present invention provides a novel device for separating gravy from fat, while at the same time, providing a receptacle, namely container 12, in which the separated gravy 72 is stored for future use.

Of course, it will be appreciated that various changes can be made to the present invention within the scope of the claims herein. For example, cover 34 can be integrally formed and/or fixedly connected (i.e. by means of an adhesive) with conduit 56. In such case, rather than removing conduit 56 from cover 34, cover 34 (along with conduit 56 and the separator member 44 when they are integrally connected together) is removed from container 12.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined in the appended claims.

What is claimed is:

1. A device for separating liquids having different specific gravities, comprising:
   a funnel-like separating member having a funnel section, an opening in an upper end of said funnel section and conduit means coupled to and extending down from a lower end of said funnel section for supplying liquid from said funnel section;
   said separating member being at least partially transparent to permit viewing of liquids therein;
   stop cock means positioned in said conduit means for selectively permitting passage of liquid through said conduit means;
   a container having an open upper end;
   cover means removably mounted on said container in covering relation to the open upper end of said container, said cover means having an opening therein for receiving said conduit means so as to support said separating member thereon, said conduit means being separable from said cover means; and
   wherein said conduit means includes an upper tube portion having a first dimension and a contiguous lower tube portion in fluid communication with said upper tube portion, said lower tube portion having a second, lesser dimension, such that a shoulder is provided between said upper and lower tube portions, said shoulder, said upper tube portion and said lower tube portion having dimensions such that said lower tube portion fits within said opening in said cover means and said shoulder sits on an upper surface of said cover means to support said conduit means and said separating member thereon.

2. A device according to claim 1, wherein said container further includes pouring spout means for pouring liquid from said container.

3. A device according to claim 1, wherein said container further includes a handle secured to an outer surface thereof.

4. A device according to claim 1, wherein said stop cock means includes variable opening means for varying the flow of liquids through said conduit means.

5. A device according to claim 1, further including filter means for permitting only liquids through the open upper end of said separating member.

6. A device according to claim 5, wherein said filter means is arranged adjacent said opening in said upper end of said separating member.

7. A device according to claim 1, comprising locking means for removably locking said cover means on said container.

8. A device according to claim 1, wherein said locking means includes an inwardly directed flange on said container and a locking flange on said cover means for mating with said inwardly directed flange on said container to removably lock said cover means on said container.

9. A device for separating liquids having different specific gravities, comprising:
   a funnel-like separating member having a funnel section, an opening in an upper end of said funnel section and conduit means coupled to and extending down from a lower end of said funnel section for supplying liquid from said funnel section;
   said separating member being at least partially transparent to permit viewing of liquids therein;
   means positioned in said conduit means for selectively permitting passage of liquid through said conduit means;
   a container having an open upper end;
   cover means removably mounted on said container in covering relation to the open upper end of said container, said cover means having an opening therein for receiving therein at least a portion of said conduit means so as to support said separating member thereon, said conduit means being separable from said cover means; and
   wherein said conduit means includes a tube-like portion defining a liquid passage between said funnel section and said container, and a shoulder provided at an intermediate position on said tube-like portion between upper and lower ends thereof, said shoulder and said tube-like portion having dimensions such that a lower portion of said tube-like portion fits within said opening in said cover means and said shoulder sits on an upper surface of said cover means to support said conduit means and said separating member thereon.

10. A device according to claim 9, comprising locking means for removably locking said cover means on said container.

11. A device according to claim 10, wherein said locking means includes an inwardly directed flange on said container and a locking flange on said cover means for mating with said inwardly directed flange on said container to removably lock said cover means on said container.

12. A device according to claim 9, wherein said container further includes pouring spout means for pouring liquid from said container.

13. A device according to claim 9, wherein said container further includes a handle secured to an outer surface thereof.

14. A device according to claim 9, wherein said means for selectively permitting passage of liquid includes variable opening means for varying the flow of liquids through said conduit means.

15. A device according to claim 9, further including filter means for permitting only liquids through the open upper end of said separating member.

16. A device according to claim 15, wherein said filter means is arranged adjacent said opening in said upper end of said separating member.

* * * * *